Patented Dec. 25, 1945

2,391,489

UNITED STATES PATENT OFFICE 2,391,489

METHOD OF MOLDING

Alfred J. Stamm and Harold Dale Turner, Madison, Wis., assignors to the United States of America, as represented by the Secretary of Agriculture No Drawing. Application May 10, 1943,
Serial No. 486,462

7 Claims. (Cl. 144—309)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a method of molding laminated articles, and has among its objects a method utilizing a conventional split mold in which precompressed plies are laid up and the mold locked in position without applying external pressure, thus eliminating the use of expensive rubber pads, bags and high-pressure cylinder equipment, but which, nevertheless, results in uniform pressure being developed on the article being molded on all sides and in all directions, thus making possible the molding, with a split mold, of laminated articles having complex curved surfaces and of non-uniform thicknesses, without producing irregularities in the surfaces of the article, internal stresses resulting in structural weaknesses, and the objectionable mold-flash, and such other objects as will be apparent from the following description and claims.

In carrying out the invention in general, a porous material, preferably a fibrous material, such as wood veneer, paper or other fibrous material in sheet or fabric form, is first impregnated with a "thermo-changing material" and with a plasticizer for the porous material, if the thermo-changing material does not serve as such. ("Thermo-changing material" as herein used is one which on heating either melts, as in the case of a thermoplastic material, or further reacts to solidify it, as in the case of a thermosetting material.) The treated material is then heated sufficiently to render the thermo-changing material soft or plastic. If a thermosetting resin is used, the preferable temperature is that somewhat below its condensation or polymerization temperature, but with a thermoplastic resin the temperature should be somewhat above its softening or plastic temperature. While at this temperature the sheets are precompressed.

The extent of precompression may be varied somewhat, but is such as to substantially reduce the volume of the sheets, depending largely upon the specific gravity of the uncompressed fibrous material. High specific gravity materials, having a specific gravity of about unity, should be almost completely precompressed (to specific gravities between 1.3 and 1.4), whereas low specific gravity materials, such as spruce veneer, need be precompressed only to a specific gravity of about 1.0.

The precompressed sheets are cooled while under pressure. This temporarily solidifies the thermo-changing material and prevents the sheets from losing their precompression when released from pressure, the thermo-changing material acting as a binding agent.

Tailored-shaped plies of the precompressed sheets are then laid up to substantially fill a conventional split mold of a configuration to give the desired shaped article, and the mold is locked in closed position. Fibrous material, in which the degree of precompression is large, need not be laid up to fill the mold as completely as with material having the smaller degree of precompression. Heat is then applied to raise the temperature to that at which the thermo-changing material is plastic. This causes the thermo-changing material to lose its temporary solidification and relieves the internal stress in the plies, thus causing the plies to tend to expand and completely fill the mold under sufficient internal pressure to bind the plies together. The material in the mold is then further thermally treated. With a thermosetting resin, for example, the heating is continued to the polymerization and condensation temperature of the resin to finally set it. The molded material may then be cooled. With a thermoplastic resin, the heating is discontinued and the resin is cooled in the mold until it sets in final form.

The method is particularly applicable to the molding of such articles as airplane propellers, which have surfaces requiring close control of their contour and which cannot have internal structural weaknesses. Prior art processes cannot be successfully used in completely molding articles of this kind.

Wood veneer of the low-density species, such as spruce, white pine, and cottonwood, when treated with an aqueous phenol-formaldehyde, resin-forming solution, followed by drying under non-polymerizing conditions (for example 18 hours at 130° F., 5 hours at 150° F., or 1 hour at 180° F., this being considerably below polymerization conditions of about from 280° F. to 310° F.) can be precompressed in a conventional hot-press at temperatures between 180° F. and 240° F., and at pressures ranging from 300 to 1000 pounds per square inch, without premature polymerization. If the pressure is released while hot, the veneer will rapidly return to approximately the original thickness. If, however, the veneer is cooled while in the press to about 100° F. or less, it can be removed from the press and will retain practically all its compression for a considerable length of time (several days). If the treated precompressed veneer is reheated from 180° to 240° F., it will rapidly expand to approximately its original volume.

The magnitude of internal pressure, which is developed by the tendency of the material to expand, may exceed 250 pounds per square inch. If the material is reheated while in the press, at least this pressure must be maintained to prevent expansion. Thus, such precompressed treated wood veneer can be readily used for molding various articles according to the method of this invention.

Denser resin-treated species, like birch, when precompressed under the high pressures (about 1000 pounds per square inch) to a specific gravity from 1.2 to 1.4, will respond similarly.

In the case of the lower specific gravity species of veneer, it is not essential that the veneer be so highly precompressed or that it be made to fill the mold so completely in order to get good bonds.

Resin-treated paper, when precompressed to a specific gravity of about 1.3, acts similarly, but its tendency for recovery is not quite as great. It is sufficient, however, to give a good bond when plies of the precompressed paper are reheated in a snugly filled locked mold.

In tests made with a two-piece metal mold, with an airfoil cross-section at right angles to the plane in which the plies were laid up, it has been demonstrated that the precompressed wood veneer plies need not be accurately tailored to fit the mold or to fill it completely. The force of expansion on reheating the plies results in sufficient internal pressure to cause them to expand and entirely fill the mold and to flow laterally to fit its edges. White pine resin-treated veneer $\frac{1}{16}$ inch thick, which has been precompressed to less than half its original thickness, when laid up in a mold without edge tailoring, gave a molded product with but a slight irregularity of the surface at the edges. Such irregularities can be further minimized by using thinner plies, by tailoring the edges, or by laying the outer ply continuously around the surface, thus covering the edges.

In the method of this invention, a flash from molding is entirely avoided, since the mold is locked in a closed position before expansion takes place. Flexing of plies, that is, movement of plies relative to each other while in the mold, with resultant internal stresses, is also avoided, since the plies are laid up in the mold in practically their final molded size and position with respect to each other along their entire lengths. Conformity to the dimensions of the mold is obtained, regardless of slight differences in the thickness of the precompressed sheet material at different positions along the mold. Such differences result from overlapping of plies or from differences in the specific gravity and compressibility of different parts of a ply that exist in contrasty grain softwoods (woods that have broad bands of summerwood in each annual ring that are several times as dense as the springwood part of the annual ring).

Other thermosetting resin-forming systems, such as resorcinol-formaldehyde, creosol-aldehyde, urea-formaldehyde, melamine-formaldehyde, and phenol-furfural, when used in a sufficiently unpolymerized condition to penetrate the cell-wall structure and thus plasticize the fibrous material, can be substituted for the water-soluble phenol-formaldehyde resin-forming mix, and will give good results. The essential requirements of the resin-forming system, when used without a plasticizer for the fibrous material, are that it will plasticize the fibrous material sufficiently that crushing beyond the elastic limit of the material does not occur on precompressing, that it will temporarily solidify sufficiently on cooling to prevent immediate loss of precompression, that it will again soften when heated, and that it can finally hardened.

If, however, the resin used does not plasticize the fibrous material, plasticizing liquids, such as water, glycerine, triethanolamine, and others which will swell fibrous materials appreciably, may be used to plasticize the fibers for precompression. These plasticizing liquids, on cooling, will not in themselves cause a temporary solidification and hold the material in a precompressed form for sufficient time for use in subsequent molding. Fibrous materials containing such plasticizing liquids may, however, be treated with thermochanging resins that merely penetrate the microscopically visible capillary structure, and hence do not, themselves, cause the plasticization of the fibrous material, as the plasticizing liquid will serve as the plasticizer, and the resin will serve as the temporarily solidifying agent to retain the precompressed material in its state of precompression when cold. Therefore, fibrous materials treated with thermoplastic resins, such as the vinyl, acrylic, styrene, cellulose ester or natural resins, or with thermosetting resins of the aforementioned types that are prepolymerized to such degree that they will not penetrate and swell the individual fibers, may be used in the process, provided a plasticizing agent is also present in the fibrous material.

To illustrate, it has been demonstrated that dry wood veneer, which has been treated with the vinyl resin "Butacite" and precompressed while hot, followed by cooling to temporarily solidify the resin, shows but little tendency to expand on reheating. However, when sufficient moisture is present to plasticize the fibrous material, it tends to expand practically to its original uncompressed volume.

Although some expansion and pressure can be obtained over very short distances in the absence of fiber plasticizers, the process is much more effective when they are present.

The precompressing can be easily accomplished in a conventional hot-press. Single sheets of resin-treated veneer or paper can be rapidly heated to the plastic temperature of from 180° F. to 240° F. by the hot-press platens and can be compressed at pressures ranging from 200 pounds to 1500 pounds per square inch, depending on the nature of the fibrous material and resin.

Several sheets can be simultaneously precompressed if they are placed between cauls made from a material which does not bond to the sheets. Cellophane serves as an excellent caul material for use between separate resin-treated paper sheets. Metal is satisfactory in most instances. With resin-treated paper, multiple sheets can be built up without the use of cauls to simplify the subsequent laying up in the mold. Sufficient bonding of the sheets to hold them together for handling is obtained in the precompressing step.

After the sheets have been precompressed to the desired thickness, they are cooled to substantially room temperature while in the press.

The treated shets of material can also be precompressed between high pressure rolls. If the sheets are fed directly from a continuous heating device to the rolls, the rolls need not be heated, and part of the cooling occurs immediately between them. Further cooling can be accomplished by passing the sheets between a second pair of cooled rolls placed as near as possible to the compressing rolls, or by blowing a blast of cold air across the sheets as they emerge from the compressing rolls.

When sheets of resin-treated wood veneer are precompressed between rolls while in a plastic condition, practically no mechanical injury occurs to the fibers. Resin-treated paper and fabrics are still less subject to injury during the precompressing operation.

If the fibrous materials contain thermosetting resins in a concentration range of from about 25 to 50 percent, or thermoplastic resins from about 15 to 50 percent (on the basis of the dry weight of the untreated material), depending on the nature of the fibrous material and on the particular resin used, no additional bonding agent need be added to the surfaces of the plies prior to molding them, since the treating resin will furnish an adequate bonding agent.

The following examples are given to illustrate specifically the manner in which our invention can be applied to various fibrous materials.

Example I

Air-dry wood veneer, such as spruce veneer, was impregnated with a water-soluble phenol-formaldehyde resinoid by a method which carried 30 percent of the weight of the dry untreated wood of the resin into the structure (see "Resin-treated, laminated compressed wood," by Alfred J. Stamm and R. M. Seborg, Trans. Amer. Inst. Chem. Eng. 37 (3): 385–398 (1941)). The impregnated veneer was dead-piled under non-drying conditions for one or two days, and was then dried under non-polymerizing conditions, such as for 5 hours at 150° F. The temperature was then raised and heating continued, preferably in a continuous drier, for a length of time just sufficient to heat the material to the softening temperature (from 180° F. to 240° F.). The plastic sheets were then immediately passed between unheated compression rolls set to compress them to a specific gravity of from 1.2 to 1.4, and thence passed between cooled rolls placed as near the compression rolls as possible to cause the resin to temporarily solidify, thus to set the fibrous material in a precompressed state.

Tailored plies of the precompressed material were laid up in a split mold of desired configuration, which was then locked in closed position filling the mold as completely as possible. The mold was then heated to a temperature and for a length of time sufficient to cause the contents to tend to expand, thus creating the necessary bonding and molding pressure, followed by curing of the resin throughout the molded article to set it in its final form. Heating and temperature ranges of from about 280° F. to 310° F. at the center of the mold for from about 20 to 40 minutes are satisfactory. The article was then cooled in the mold, and thereafter removed.

Example II

Wood veneer, such as spruce veneer containing 15 percent of moisture, was impregnated with 25 percent of a vinyl resin dissolved in a suitable solvent by a method that caused substantially complete penetration of all the microscopically visible capillary structure. The solvent was removed by evaporation with heat and heating was continued until the material was quite soft due to softening or fusion of the resin, avoiding, however, the loss of any appreciable part of the moisture. The hot soft sheets were immediately passed between compression rolls set to compress them to a specific gravity of from 1.2 to 1.4, followed by passing them between cooling rolls to temporarily solidify the resin, and thereby hold the sheets in the state of precompression.

Plies of the precompressed sheets were then laid up in a suitable mold, in a manner similar to that given in Example I, and the mold was locked in position. The material in the mold was then heated above the setting or gelling temperature of the resin followed, after recovery from precompression was completed, by cooling the molded, bonded article to room temperature in the mold before removing it.

The foregoing examples cover only the molding of one species of veneer containing one type of thermosetting resin (Example I) or containing one thermoplastic resin together with one plasticizer (Example II), in one concentration, under one set of compressing and one set of molding conditions. However, it has been demonstrated that any species of veneer that can be treated with the specific resin used, or any compressible, readily treated form of paper, or any fabric with a specific gravity preferably less than unity, can be substituted for the veneer of the examples. Also, in Example I, any fiber-penetrating thermosetting resin, at any concentration that will plasticize the fibrous material at an elevated temperature (from about 25 to 50 percent of the dry weight of the untreated fibrous material), at a temperature below that at which appreciable condensation or polymerization occurs, and which will solidify on cooling sufficiently to temporarily hold the compressed fibrous material in a compressed state, may be substituted for the water-soluble phenol-formaldehyde resin.

In Example II, other swelling or plasticizing agents for the fibrous material, such as glycerine, glycol, or triethanolamine, in concentration ranges of from about 10 percent to 20 percent of the weight of the dry, untreated fibrous material, may be substituted for the water plasticizer, and other thermoplastic resins, such as the acrylic, styrene, cellulose ester or natural resins, or partially polymerized thermosetting resins, in concentration ranges of from 15 percent to 50 percent of the weight of the untreated fibrous material, may be substituted for the vinyl resin.

Having thus described the invention, what is claimed is:

1. A method of molding laminated articles, comprising: impregnating sheets of porous compressible material with a thermo-changing material; precompressing the sheets at a temperature at which the thermo-changing material is plastic to reduce substantially the volume of the sheets; cooling the sheets while in the reduced volume to such a temperature as to temporarily solidify the thermo-changing material and hold the sheets in the state of precompression; laying up plies of the precompressed cooled sheets to occupy substantially the volume and configuration of the desired molded article without applying external pressure thereto; heating the plies while so laid up to the temperature at which the thermo-changing material is plastic and over a sufficient interval of time to cause the thermo-changing material to lose its temporary solidification, thus causing the plies to tend to expand, while confining the plies to the desired volume and configuration thus placing them under compression; and finally thermally treating the confined plies to set the article in its desired volume and configuration.

2. A method of molding laminated articles from sheets of wood veneer, comprising: impregnating the sheets with about 30 percent of a water-soluble cell-wall penetrating phenol-formaldehyde resin-forming mix (on the basis of the weight of the dry untreated wood); heating the impregnated sheets at a temperature of from about 180° F. to 240° F.; precompressing the sheets while so heated to a specific gravity of from about 1.2 to 1.4; cooling the sheets to temporarily solidify the resin and hold the sheets in the state of precompression; laying up plies of the precompressed cooled sheets to occupy substantially the volume and configuration of a desired molded article without applying external pressure thereto; and heating the plies while so laid up at a temperature of from about 280° F. to 310° F. at the interior of the article, for from about 20 to 40 minutes, the while confining the plies to the desired volume and configuration, thus placing them under compression and producing a permanent setting of and bonding by the resin.

3. A method of molding laminated articles from sheets of wood veneer containing from about 10 to 20 percent moisture, comprising: impregnating the sheets with about 25 percent of a partially polymerized phenol-formaldehyde resin (on the basis of the weight of the dry untreated wood); heating the impregnated sheets at a temperature of from about 180° F. to 240° F.; precompressing the sheets while so heated to a specific gravity of from about 1.2 to 1.4; cooling the sheets to temporarily solidify the resin and hold them in the state of precompression; laying up plies of the precompressed cooled sheets to occupy substantially the volume and configuration of a desired molded article without applying external pressure thereto; and heating the plies while so laid up at a temperature of from about 280° F. to 310° F. at the interior of the article, for from about 20 to 40 minutes, the while confining the plies to the desired volume and configuration, thus placing them under compression and producing a permanent setting of and bonding by the resin.

4. A method of molding laminated articles, comprising: impregnating sheets of fibrous material with a thermoplastic resin; precompressing the sheets at a temperature at which the resin is plastic to reduce substantially the volume of the sheets; cooling the sheets while in their reduced volume to temporarily solidify the resin and hold the sheets in the state of precompression; laying up plies of the precompressed cooled sheets to occupy substantially the volume and configuration of a desired molded article without applying external pressure thereto; heating the plies while so laid up to the temperature at which the resin is plastic and over a sufficient interval of time to cause the resin to lose its solidification, thus causing the plies to tend to expand, the while confining the plies to the desired volume and configuration, thus to place them under compression; and cooling the molded article while confined to the desired volume and configuration to finally set the resin.

5. A method of molding laminated articles from sheets of wood veneer containing from about 10 percent to 20 percent moisture, comprising: impregnating the sheets with about 20 percent of a vinyl resin (on the basis of the weight of the dry untreated wood); precompressing the impregnated sheets to a specific gravity of from about 1.2 to 1.4 at a temperature at which they and the resin are plastic; cooling the sheets while precompressed to temporarily solidify the resin and hold them in the state of precompression; laying up plies of the precompressed cooled sheets to occupy substantially the volume and configuration of a desired molded article without applying external pressure thereto; heating the plies while so laid up to a temperature at which the resin is plastic and over an interval of time sufficient to cause the resin to lose its solidification, thus causing the plies to tend to expand, the while confining the plies to the desired form and configuration, thus to place them under compression; and cooling the molded article while confined to the desired volume and configuration to finally set the resin.

6. A method of molding laminated articles, comprising: impregnating sheets of fibrous material with a thermosetting resin; precompressing the sheets at a temperature at which the resin is plastic but below the temperature which sets the resin to reduce substantially the volume of the sheets; cooling the sheets while in the reduced volume to such a temperature as to temporarily solidify the resin and hold the sheets in the state of precompression; laying up plies of the precompressed cooled sheets to occupy substantially the volume and configuration of a desired molded article without applying external pressure thereto; heating the plies while so laid up to the temperature at which the resin is plastic and over a sufficient interval of time to cause the resin to lose its temporary solidification, thus causing the plies to tend to expand, the while confining the plies to the desired volume and configuration, thus placing them under compression; and continuing to heat at a temperature of from about 280° F. to 310° F. at the interior of the article, for from about 20 to 40 minutes to permanently set the resin.

7. A method of molding laminated articles, comprising: impregnating sheets of fibrous material with a plasticizer for the fibrous material and with a partially polymerized thermosetting resin; precompressing the sheets at a temperature at which they and the resin are plastic but below the temperature at which the resin further polymerizes to reduce substantially the volume of the sheets; cooling the sheets while in the reduced volume to such a temperature as to temporarily solidify the resin and hold the sheets in the state of precompression; laying up plies of the precompressed cooled sheets to occupy substantially the volume and configuration of a desired molded article without applying external pressure thereto; heating the plies while so laid up to the temperature at which the resin is plastic and over a sufficient interval of time to cause the resin to lose its temporary solidification, thus causing the plies to tend to expand, the while confining the plies to the desired volume and configuration, thus placing them under compression; and continuing to heat at a temperature of from about 280° F. to 300° F. at the interior of the article, or from about 20 to 40 minutes, to further polymerize the resin and thus permanently set it.

ALFRED J. STAMM.
H. DALE TURNER.